2 Sheets—Sheet 1.

C. CARR.

C. CARR Assignor to J. STEPHENSON.

DEVICES FOR RINGING STREET CAR BELLS.

No. 7,310. Reissued Sept. 12, 1876.

Attest:
A. McCallum
D. G. Stuart

Inventor:
Charles Carr
by S. Hannay
Att'y.

N. PETERS, PHOTO-LITHOGRAPHER, WASHINGTON, D. C.

2 Sheets—Sheet 2.
C. CARR.
C. CARR Assignor to J. STEPHENSON.
DEVICES FOR RINGING STREET CAR BELLS.
No. 7,310. Reissued Sept. 12, 1876.
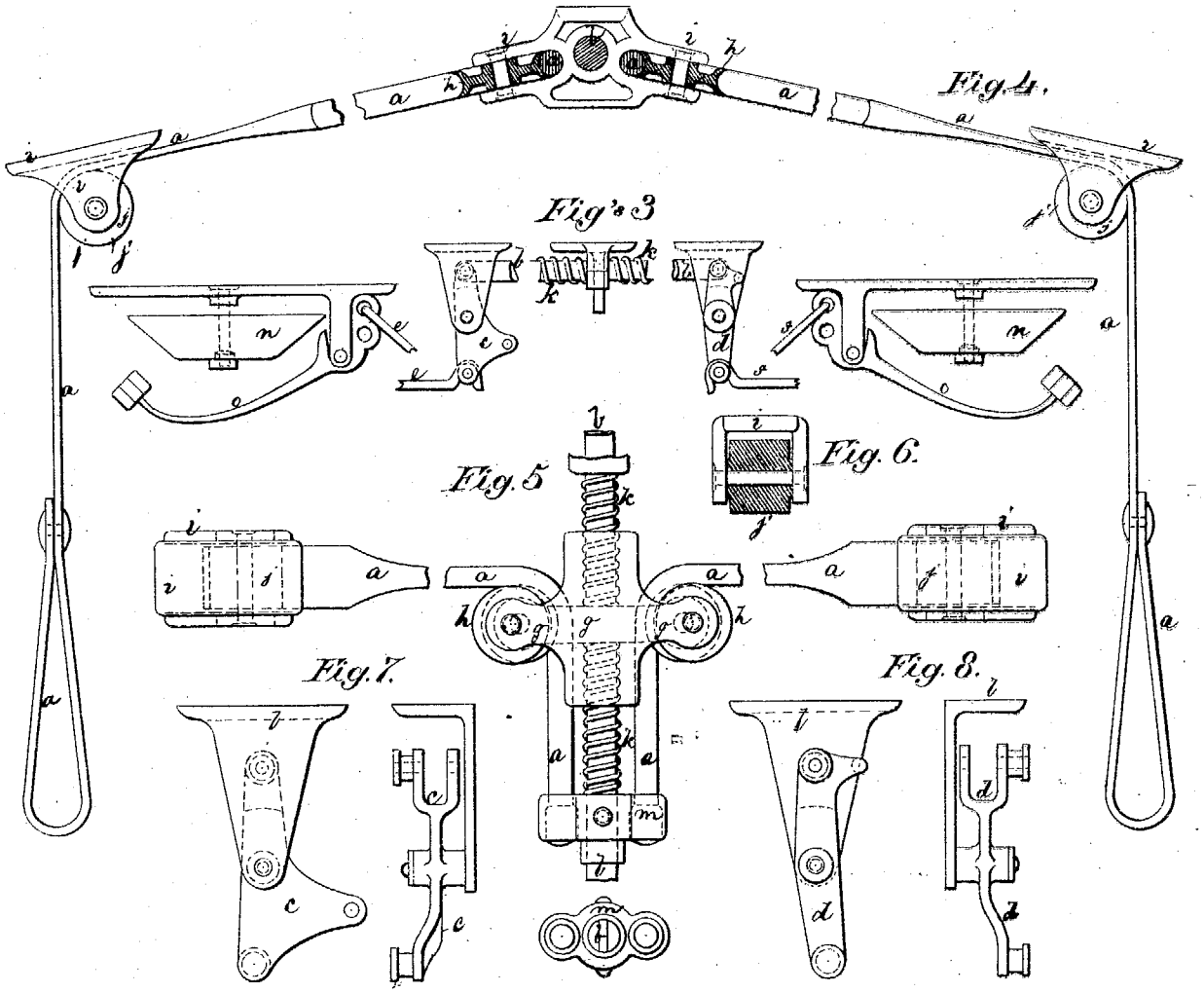
Attest:
A. McCallum
D. G. Stuart
Inventor:
Charles Carr
by S. Hannay
Att'y.
N. PETERS, PHOTO-LITHOGRAPHER, WASHINGTON, D. C.

UNITED STATES PATENT OFFICE.

CHARLES CARR, OF BOSTON, MASS., ASSIGNOR TO JOHN STEPHENSON.

IMPROVEMENT IN DEVICES FOR RINGING STREET-CAR BELLS.

Specification forming part of Letters Patent No. 101,580, dated April 5, 1870; antedated April 1, 1870; reissue No. 7,310, dated September 12, 1876; application filed August 19, 1876.

*To all whom it may concern:*

Be it known that I, CHARLES CARR, of Boston, in the county of Suffolk, and State of Massachusetts, have invented certain new and useful Improvements in Signaling Apparatus for Public Conveyances; and I do hereby declare that the following is a full, clear, and exact description thereof that will enable others skilled in the art to which it appertains to make and use the same, reference being had to the accompanying drawings, and to the letters of reference marked thereon, which form a part of this specification, in which—

Figure 2:
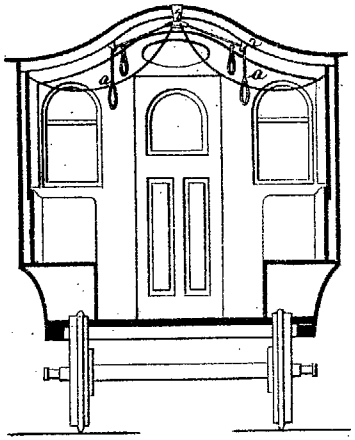
Figure 1:
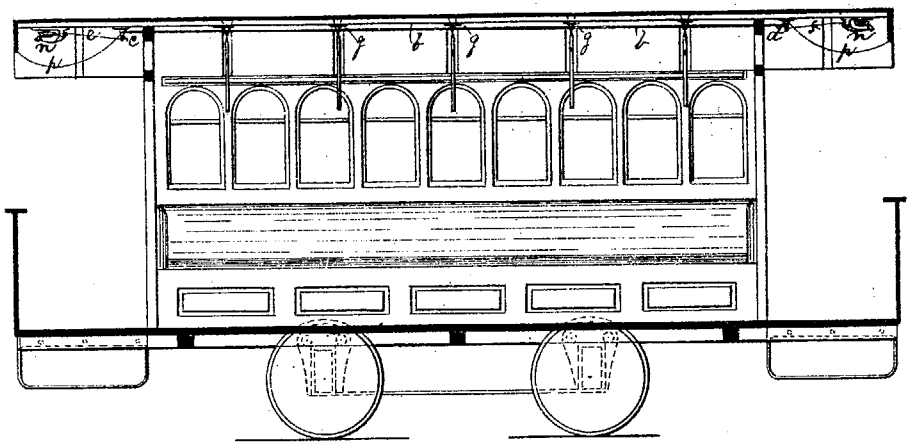

Figure 1 is a longitudinal sectional elevation of a street-car, illustrating the nature and application of my improvement. Fig. 2 is a similar transverse sectional elevation. Fig. 3 is an enlarged view of the apparatus corresponding to Fig. 1. Fig. 4 is an enlarged sectional view corresponding to Fig. 2. Fig. 5 is a plan of a portion of the apparatus. Fig. 6 is a sectional view of one of the guide-pulleys for the strap-pulls. Fig. 7 embraces two views of one of the intermediate levers between the spring-rod and the bell or other indicator. Fig. 8 embraces two views of the other lever for like purpose, but adapted to the functions required at the opposite end of the car or apparatus.

Like letters refer to the same or corresponding parts in all the figures.

In Figs. 1, 2, and 3 may be seen two signal-bells, *n*, one arranged at each end of the car. The driver, when horses are used, ordinarily stands beneath the one bell, and the conductor beneath the other.

The objects to be attained by means of the apparatus are as follows: First, to afford the conductor facilities to signalize the driver; second, to afford the driver facilities to signalize the conductor; third, to afford the passengers facilities to signalize the conductor alone, thereby avoiding the inconveniences and evils arising from the promiscuous signaling of the driver by the passengers, not the least of which arises from the fact that the horses become accustomed to stop and start at the sound of the signal-bell at the driver's end of the car; one object, therefore, of this improvement is to secure to the conductor exclusive control of those signals in obedience to which the driver stops and starts his car, and also in obedience to which the horses, by constant use, acquire the habit of stopping and starting; fourth, to afford passengers, while seated, facilities for communicating with the manager of the car.

This arrangement is especially convenient for ladies, and is important in cars operated without conductors.

Intermediate between the bells *n* is arranged a rod, *b*, so as to slide freely in the direction of its length toward and from the points of location of the bells. This rod is provided with springs *k*, whereby it is made to return to its central position on being released after it is made to slide in either direction. I will here observe that this rod need not necessarily be sustained in slides, as any other means may be used which will allow it to perform like functions.

The means for giving the longitudinal movement to rod *b* are clearly shown in Figs. 4 and 5, and consist of the strap-pulls *a*, guided by the pulleys *h* and *j*. The pulleys *h* and *j* are carried in any suitable stationary stands *i*. The rod *b* may also receive its longitudinal motion by means of straps and connections *e*, *f*, and *p* at either end of the car. The straps or connections *e*, *f*, and *p* may be attached, in some cases, directly to the rod, but ordinarily I interpose the levers *c* and *d*, one at either end respectively. By means of said levers *c* and *d* I am furnished with convenient facilities to reverse, as occasion requires, the movement derived from the longitudinal movement of rod *b* in its application to produce the signal by striking the bell or operating such other indicator as may at any time be substituted for the bell.

The rod *b*, in all cases, should be of a rigid nature, so far that its motion may surely be communicated in either direction from the points of attachment of the pulls *a*, which always give movement to the rod in one direction only. The materials to be used in the construction of the several parts may be such as are ordinarily employed in the art or may suggest themselves to the maker as best adapted to the purpose.

The operation may be explained as follows: It being assumed that the part of Fig. 5 at the bottom of the drawing is toward the right hand in Figs. 1 and 3, then, if a passenger draws the pull *a*, (see Figs. 4 and 5,) the rod *b* is moved to the left in Figs. 1 and 2. This motion tilts the lever *c*, Fig. 3, draws the connection *e*, and causes hammer *o* to strike its bell *n*, under which the conductor stands. The conductor then pulls the strap *p*, Fig. 1, which tilts lever *c* in the opposite direction, and through it moves the rod *b* in the opposite direction, tilting lever *d*, drawing connection *f*, and causing hammer *o* to strike bell *n*, over the driver's head, thus signaling him, the springs *k* always returning, by their recoil, the rod *b* to its central position. If the driver desires to signalize the conductor, he draws the connection *f*, Figs. 1 and 2, toward the right-hand end of the drawing, tilting lever *d*, moving rod *b*, tilting lever *c*, drawing connection *e*, and causing hammer *o* to strike bell *n*. When the car stops, and starts in the opposite direction, and the driver and conductor consequently exchange positions, then the connections *e* and *f* are disconnected from the lower ends of levers *c* and *d* and connected to the tops of the same levers, and all is right to operate as before with reference to the driver and conductor.

It will be observed that the hand-straps or pulls *a* are conveniently arranged within reach of the passengers while seated. For this purpose they may hang against the side walls of the car, at the backs of the passengers, or they may be suspended in front, as shown in Fig. 2. For the use of the conductor, when he is within the car, a private pull may be arranged in the top of the car, not easily accessible to passengers.

Having thus described my improvement, what I claim as my invention, and desire to secure by Letters Patent, is—

1. The spring-rod *b*, in combination with the bells *n* or equivalent signal, substantially as described.

2. The combination, with the signaling devices of a public conveyance, of hand-pulls *a*, or equivalent device, so arranged with respect to the seats that the passengers can, without rising therefrom, communicate by signal with the manager of the conveyance, substantially as set forth.

3. The combination of the hand-pulls *a* or equivalent devices with the spring-rod *b*, substantially as set forth.

4. The levers *c d*, in combination with the spring-rod *b* and the connections *e f* and *p p*, substantially as described.

5. The combination of signaling apparatus, constructed and arranged substantially as described, with a passenger-car, whereby, through pulls *a* or their equivalent, conveniently accessible to the passengers within, the signals can be given at one end only of the car during its progress in one direction, while, by the same combination of apparatus with the car, provision is also made for convenient and direct signals between the conductor at one end of the car, and the driver at the other, substantially as set forth.

In testimony that I claim the foregoing I have hereunto set my hand this 10th day of August, 1876.

CHARLES CARR.

Witnesses:
WM. H. HART,
CHAS. F. HARRIMAN.